United States Patent

Richards, Jr.

[15] 3,644,687

[45] Feb. 22, 1972

[54] CONDUCTOR IDENTIFICATION IN MULTICONDUCTOR MEANS

[72] Inventor: Samuel E. Richards, Jr., Kansas City, Mo.

[73] Assignee: Communications Research Company, Mineral Wells, Tex.

[22] Filed: May 12, 1969

[21] Appl. No.: 823,750

[52] U.S. Cl. ....................179/175.3, 324/66

[51] Int. Cl. ....................H04m 3/00

[58] Field of Search ....................179/175.3; 324/66

[56] References Cited

UNITED STATES PATENTS

| | | | |
|---|---|---|---|
| 2,806,995 | 9/1957 | Meanley | 324/66 |
| 3,252,088 | 5/1966 | Palmer | 324/66 |
| 3,287,509 | 11/1966 | Bohnenblust | 324/66 |
| 3,288,943 | 11/1966 | Bohnenblust | 179/175.3 |
| 3,288,944 | 11/1966 | Fleming | 324/66 |
| 3,427,538 | 2/1969 | Bohnenblust | 324/66 |

*Primary Examiner*—Kathleen H. Claffy
*Assistant Examiner*—Douglas W. Olms
*Attorney*—Wofford and Felsman

[57] ABSTRACT

This specification discloses an improvement in method and apparatus for identifying at a remote position conductors in a multiconductor means having the conductors identified at one end. The improvement is characterized by sequentially stepping by control signals from the remote position a sequential stepping switch onto contacts to which the identified conductors at the one end are connected, until a specifically identified conductor is connected with the sequential stepping switch. Thereafter, an identifiable signal is put on the specifically identified conductor and the conductor carrying the signal at the remote position is identified. The invention is particularly described with respect to repairing a telephone cable, or reconnecting groups of wire pairs from one cable to another in a telephone line system. In such telephonic work, ordinarily, it is advantageous to employ a second sequential switching device in conjunction with the sequential stepping switch to be able to monitor a pair of conductors, or wires, and to thereafter check out each individual wire of the pair. Also, disclosed is a field monitor unit to assist the repairman in maintaining a record of the particular conductor onto which the sequential stepping switch has been actuated. Other aspects are also described; such as, a flip-flop mode of operation in which correlated pairs of wires in a multiwire cable are identified for immediate changing of wires in a group with consequent lessening of chance of error.

17 Claims, 3 Drawing Figures

INVENTOR
Samuel E. Richards, Jr.
BY
Wofford & Felsman
ATTORNEYS

INVENTOR
Samuel H. Richards, Jr.
BY
Wofford & Felsman
ATTORNEYS

INVENTOR
Samuel E. Richards, Jr.
BY
Wofford & Felsman
ATTORNEYS

CONDUCTOR IDENTIFICATION IN MULTICONDUCTOR MEANS

BACKGROUND OF THE INVENTION

1. Field of the Invention

This invention relates to identification at a remote position of conductors in an electrical system in which the conductors are identified at one end of a multiconductor means. This invention particularly relates to method and system whereby a repairman working in the field on a multipair cable in communications equipment may, through the use of automated equipment at the office, select and positively identify individual wires and numbered wire pairs at the remote position.

2. Description of the Prior Art

Identification of conductors in a multiconductor means has been a problem in several areas; such as, aircraft wiring, ship wiring and telephone systems. The greatest distances involved are in telephone systems. In telephone systems, it is often necessary to repair a cable which has been severed; or it may be desirable to change a group of wire pairs from one cable connecting field phones with the office to another cable going to the office, freeing the first cable for a more convenient grouping of wire pairs; e.g., service to a new shopping center. Accordingly, the primary description given herein will be with respect to telephone systems. It is believed that once the principles are clear with respect to telephone systems, application to other areas may be made by one skilled in the art using the principles and detailed description in conjunction with the generalized description herein. The prior art shows complex, automatically rotated office units and follower stepping indicators in the field which rotate until a discontinuity of a wire is detected and that discontinuity signaled. Also known in the prior art are complex coded signals impressed at the office and detected at the field position. Such elaborate units require high levels of skill to maintain them in good working order and even then are not altogether reliable.

At the other end of the spectrum the prior art shows simple systems in which a helper at the office imposes a tone onto a given wire and the repairman at the field position runs through the wires until this tone is finally picked up on a given wire. This system is dependable but is expensive and time consuming since it requires two workers, both of which must be skilled and reliable in their work.

The prior art also discloses systems in which a given numbered wire pair can be dialed from the remote position. This system is useful for identifying a single wire pair but becomes time consuming when multiple-wire pairs are to be identified and operated upon; such as, when a group of wire pairs is to be changed from one cable to another cable.

Systems are also known in which the tone applied at a field, or remote, position steps relays in the office through a sequence of tens and units to feed back information as to the particular cable pair on which the tone was applied. Also, a system is known in which sets and subsets of signals are applied at the office, detected in the field; then the wires rearranged in the field in complimentary subsets and the signal again applied such that mathematically plotted, the combination of unique signals afforded discrete identification. It is readily apparent that such systems were complex and not altogether reliable, again requiring a high level of skill in the operators and in maintaining the equipment.

Accordingly, it can be seen that the prior art has not provided a simple, economical method and system; employing reliable, long tested equipment; that would identify with certainty conductors in a multiconductor means without a time consuming operation requiring a high level of skill in the operating personnel, or a plurality of personnel.

BRIEF DESCRIPTION OF THE DRAWINGS

FIG. 3 is a schematic block diagram of another embodiment of the invention in which the communication links comprise modulator-demodulator means.

DESCRIPTION OF PREFERRED EMBODIMENT(s)

Figure 1:
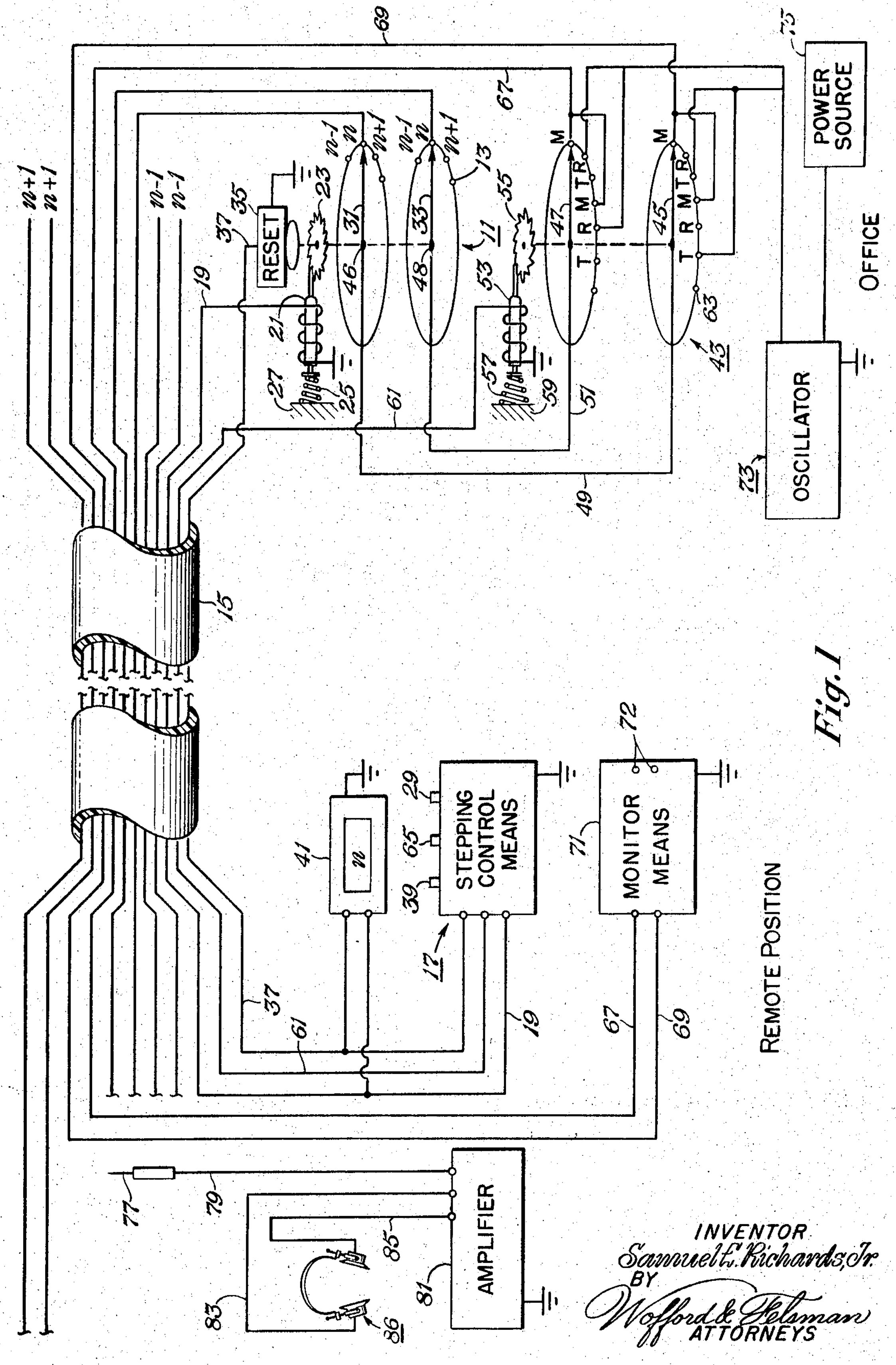
FIG. 1 is a schematic illustration of one embodiment of the invention as related to a telephone system.

Referring now to the drawings and particular FIG. 1, the system for identifying wire pairs in a multiwire telephone cable includes as an essential element a sequential stepping switch 11 located at the end of a telephone cable where the wire pairs are identified; ordinarily, at an office where the wire pairs are connected in numerical order to a panel. Sequential stepping switch 11 has a plurality of contacts 13. Contacts 13 are connected, respectively and sequentially, according to identification with the wire pairs in cable 15. For example, the $n^{th}$ wire pair is illustrated being connected to one of the contacts 13, a first wire being connected to the upper deck of contacts and a second wire in the wire pair being connected to the contact in the lower deck of contacts.

A communication link connects sequential stepping switch 11 and a portable stepping control means 17 at a remote position where the wire pairs are to be identified. For example, conductor 19, which may be a spare wire in the cable, may be employed as the communication link. Actuating means; such as, solenoid 21 and stepping ratchet 23; may be provided to actuate sequential stepping switch 11 to sequentially step it to a specifically identified wire pair. Solenoid 21 is returned to its normal position by spring 25 fastened to support 27. Thus, depressing sequential stepping switch control button 29 on the stepping control means actuates solenoid 21 to advance sequential stepping switch 11 one set of contacts. As illustrated, wiper arms 31 and 33 on sequential stepping switch 11 are mechanically connected with stepping ratchet 23 and move in parallel to the respective contacts.

Reset means 35 is also connected with the wiper arms and provide means for returning wiper arms to the zero, or starting position. Reset means 35 is connected by a second conductor 37, which may be an extra wire in cable 15, with stepping control means 17. Thus, depressing reset button 39 on stepping control means 17 causes sequential stepping switch to return to the starting position.

Field monitor 41 is electrically connected with stepping control means 17 and responds thereto in the same manner as does sequential stepping switch 11. Field monitor 41 steps sequentially when stepping control button 29 is depressed and resets to its starting position when reset button 39 is depressed. Thus, field monitor 41 provides a record at the remote position of the specifically identified conductor or wire pair onto which the sequential stepping switch has been actuated.

Sequential stepping switch 11 is connected with a second sequential switching device 43 when identifying wire pairs in a multiwire cable such as in a telephone system. Specifically, wiper arms 31 and 33 are connected, respectively, with wiper arms 45 and 47 via terminals 46 and 48 and conductor means 49 and 51.

A communication link, including a second actuating means, also connects second sequential switching device 43 with stepping control means 17 at the remote position. For example, solenoid 53, stepping ratchet 55, spring 57 and support means 59 are connected via electrical conductor 61 with stepping control means 17 and operate to sequentially actuate the second sequential switching device onto respective parallel contacts 63. Thus, depressing second sequential switching device control button 65 on stepping control means 17 advances wiper arms 45 and 47 of second sequential switching device one set of contacts.

As illustrated, wiper arms 45 and 47 are connected together and both with stepping ratchet 55 so as to move in parallel.

Every third contact on each of the illustrated parallel decks of contacts represents a monitor position "M." In the monitor position, wiper arms 45 and 47 are connected with conductors 67 and 69 which are in turn connected with a monitoring device, illustrated as monitor means 71, at the remote position. Monitor means 71 contains an amplifier and speaker; and may contain external meter jacks 72 if desired.

To identify the respective wires, an identifiable signal from an identifying transmitting means is impressed onto one of the wires in the wire pair and the wire carrying the identifiable signal at the remote position identified by use of a portable identifying receiving means. Next, the identifiable signal is impressed onto the other wire of the wire pair and the wire carrying the identifiable signal is identified at the remote position. For example, as identifying transmitting means, continuously running oscillator 73 is connected to the one of contacts 63, marked "R" position, on the first, or top, deck but not to the R position on the second deck. The R position is employed in telephone repair parlance to indicate the ring wire, or the wire connected to the ring portion of a conventional bayonet probe. Also, oscillator 73 is connected to the "T" position of contacts 63 on the second deck but not to the T position on the first deck. T is employed to signify the tip wire, or the wire connected to the tip portion of the bayonet probe. Around each deck of contacts the respective monitor M positions are connected in parallel and with respective conductors 67 and 69; the respective ring R positions on the first deck are connected in parallel and with oscillator 73; and the tip T positions on the second deck are connected in parallel and with oscillator 73.

Since oscillator 73 runs continuously and is connected with the respective ring and tip positions, it is desirable that the second sequential switching device be stepped to the monitor position at least by the time the sequential stepping switch is actuated onto the next cable pair to prevent the tone from the oscillator being impressed onto a telephone circuit which might be busy.

To illustrate the portable identifying receiving means for detecting the identifiable signal and isolating the wire carrying the identifiable signal at the remote position; probe 77 is connected via conductor 79 with amplified 81; which is, in turn, connected via conductors 83 and 85 with headset 86 for effecting audio identification of the wire carrying the tone from oscillator 73.

For clarity of illustration and explanation individual conductors or wires have been shown for connecting components at the office with other components at the remote position. In fact, by logic and multiplexing the number of conductors required can be reduced to a single cable pair and ground. Even without logic or multiplexing, the monitoring done through the M position may employ the other conductors. Specifically, for example, conductor 67 may be the same as conductor 37, and conductor 69 may be the same as conductor 61. Reducing the number of conductors that have to be isolated by older and less desirable techniques reduce the time the repairman must spend connecting his equipment, as described hereinafter.

In operation, the wire pairs identified at the office are connected, sequentially and respectively, according to their identification, normally numerical as indicated, with contacts 13 on sequential stepping switch 11. Second sequential switching device 43 is connected with sequential stepping switch 11. The respective contacts 63 of second sequential switching device are connected, respectively, as indicated hereinbefore with oscillator 73 and with conductors 67 and 69. Spare conductors 19, 37 and 61 are connected with the respective actuating means; such as, the solenoids 21 and 53; of sequential stepping switch 11 and second sequential switching device 43. Oscillator 73 is started to run by connecting it with power source 75.

The repairman then goes to the remote position at which the respective wire pairs are to be identified. The remote position may be a field position at which the telephone cable has been cut and telephone service is to be restored or it may be an established position at which the wire pairs are to be identified for one or more purposes; such as, "making a throw." By "making a throw" is meant changing the connections of a group of wire pairs coming from the field from one group of wire pairs coming from the central office to another.

In any event, the repairman identifies the cable pair or pairs serving functionally as respective conductors 19, 37, 61, 67 and 69 at the remote position and connects them respectively to the stepping control means 17 and, hence, with field monitor 41 and to monitor means 71. The cable pair or pairs may have been previously tagged by repairmen at an established field position or may be identified separately by any one of the conventional and less desirable techniques delineated hereinbefore.

Probe 77 and amplifier 81 are also connected with headset 86 for identifying the wire carrying the identifiable signal from oscillator 73. If desired amplifier 81 can be appropriately connected with the amplifier and speaker in monitor means 71.

Suppose the $n^{th}$ wire pair in cable 15 is the first wire pair to be identified at the remote position. Sequential stepping switch control button 29 is depressed $n$ times to step sequential stepping switch 11 and field monitor 41 to the $n^{th}$ position as illustrated in FIG. 1. Second sequential switching device 43 is in the monitor position such that the repairman can monitor by monitor means 71 wire pair number $n$ to determine if it is busy. If it is not busy, the repairman depresses second sequential switching device button 65 to actuate second sequential switching device 43 to the next contacts such that wiper arm 47 engages, in the R position, the contact to which is connected oscillator 73. Oscillator 73 thus imposes a signal on the ring wire of the wire pair, via conductor 51 and wiper arm 33. The repairman at the remote position identifies with probe 77 the wire carrying the identifiable signal from oscillator 73. While FIG. 1 is drawn with ends of the wires open such that probe 77 can be coupled directly, probe 77 may also be operatively and capacitatively coupled with the wire to identify the wire carrying the identifiable signal. Once the wire has been identified a desired operation is performed upon the specifically identified wire. The operation may be simply tagging the wire by incorporating it into a tag board at a specifically identified slot or it may be connecting it to another wire. Other operations may be performed if desired.

Thereafter, second sequential switching device 43 is actuated to the T position by depressing second sequential switching device button 65. Consequently, oscillator 73 now imposes the signal on the other wire, called the tip wire, via the T position and wiper arm 45 and conductor 49. Again the repairman at the remote position identifies the wire carrying signal from oscillator 73 by probe 77. Once identified the desired operation is performed upon the second, or tip, wire of the wire pair.

Second sequential switching device 43 is moved to monitor position and sequential stepping switch 11 is moved to wire pair ($n$+1) and the sequence of operations is repeated with respect to it, if it is another of the specifically identified wire pairs that are to be identified at the remote position. The invention has its greatest usefulness and its most advantageous over the prior art devices when several wire pairs in sequence are to be identified at the remote position.

Although duplicate decks of contacts have been described in this preferred embodiment because of their advantage with respect to identifying wire pairs in a multiwire cable, single decks may be employed, particularly where only single conductors are to be identified at the remote position.

Moreover, when single conductors in a multiconductor means are to be identified at a remote position; it is, ordinarily, not necessary to employ the second sequential switching device since the identifiable signal can be impressed directly through the sequential stepping switch onto the conductor being identified. Furthermore, it is not necessary to monitor the single conductor being identified, or if necessary the monitoring can be done at the remote position without the requirement for any additional communication link.

Any communication link can be employed which will transmit the required data and command signals, as indicated hereinbefore. Instead of specific extra conductors in the cable, other communication links; such as, radio communication and modulation-demodulation of a carrier signal; can be employed.

Although a sequential stepping switch 11 using actuating means and wiper arms have been described in this embodiment, there may be employed any other sequential stepping switch or switching device; such as, a cross bar switch or other random access switch device; that can be programmed to switch in a sequential manner. For example, solid-state switching devices having a plurality of contacts can be employed as sequential stepping switches. While only a few contacts on each deck are illustrated in the interest of clarity and simplicity, any number can be employed. For example, it has been found advantageous to employ about 50 contacts on each deck.

Similarly, although a second sequential switching device 43 employing actuating means and wiper arms have been described, any sequential switching device may be employed therefor. In fact, the same sequential switching devices may be employed, respectively, as sequential stepping switch 11 and second sequential switching device 43. For example, solid-state sequential switching devices having a plurality of contacts can be employed as second sequential switching devices. Although only two sets of three contacts each have been illustrated in FIG. 1, any number may be employed. It has been found that 30 contacts, 10 sets of three contacts each, afford a good second sequential switching device.

Any identifiable signal may be employed to identify the wire carrying that signal. The tone from an oscillator, serving as a tone generator, has been described hereinbefore since it affords a relatively positive method of identification and is readily amenable to capacitive coupled detection and identification. On the other hand, discrete voltages or coded signals may be imposed onto the wire and detected at the remote position and the wire carrying the discrete and identifiable signal determined at the remote position.

Figure 2:
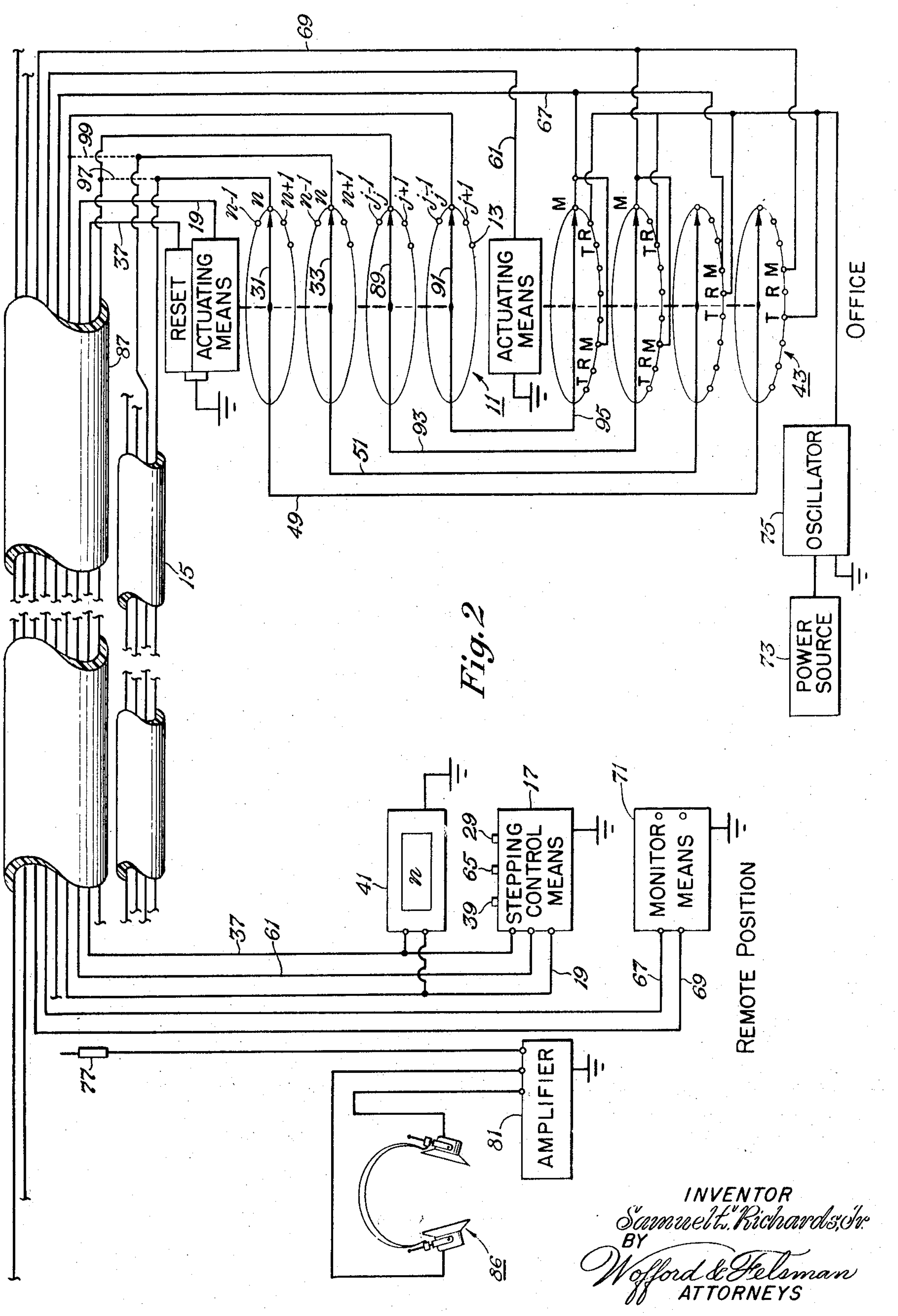
FIG. 2 is a schematic illustration of another embodiment of the invention in which correlated wire pairs in a cable are identified.
Figure 5:
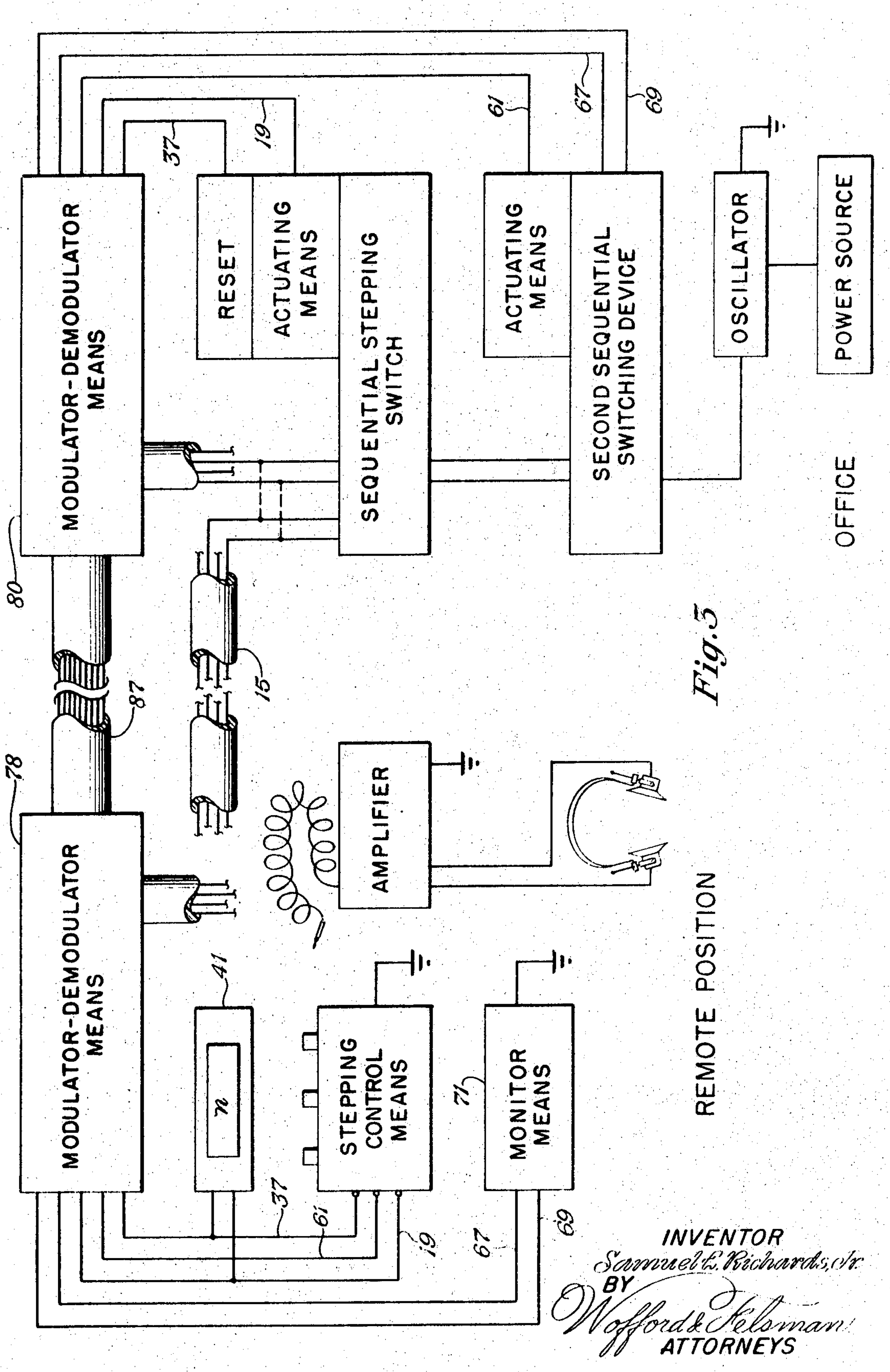

Referring to FIG. 2, the system for identifying wire pairs includes the essential sequential stepping switch 11, having a plurality of contacts 13. Wire pairs from a first group of wire pairs, illustrated by cable 15, are identified at one end; ordinarily, at the office. They are connected, respectively and sequentially according to their identification with contacts 13. For convenience, the wire pairs are illustrated as being connected with parallel decks of contacts 13 such that one wire of cable pair *n* is connected with contacts 13 on one deck of contacts and the other of wire pair *n* is connected with a parallel deck of contacts 13. A second group of wire pairs; such as, cable 87; has its wire pairs identified at the one end and connected, respectively and sequentially in correlation with wire pairs from the first group, with contacts 13 on two additional and parallel decks of contacts. Specifically, one wire of wire pair *j* is connected with contacts 13 on a third deck of contacts and the other wire of wire pair *j* is connected with contacts on a fourth deck of contacts. The sequential stepping switch moves all wiper arms in parallel, thus, the respective four wires of two correlated wire pairs, one wire pair of a first group and a second wire pair of a second group, are connected via wiper arms with four respective terminals on sequential stepping switch. As described hereinbefore, sequential stepping switch may have an actuating means and a reset means connected via appropriate communication link with stepping control means 17 at the remote position. Thus, depression of sequential stepping switch control button 29 actuates sequential stepping switch to move onto the next sequential contact. Specifically, for example, wiper arms 31 and 33 are stepped from wire pair (*n*-1) to wire pair n by a single depression of sequential stepping switch control button 29. Similarly wiper arms 89 and 91 step from wire pair (*j*-1) onto wire pair *j* by this same single depression since wiper arms 31, 33, 89 and 91 move in parallel.

The wiper arms thus connect the respective contacts with four terminals of the four decks of contacts; the terminals are in turn connected with first through fourth, numbering from top down for convenience, decks on the second sequential switching device 43 via electrical conductors 49, 51, 93, and 95.

As described hereinbefore, second sequential switching device 43 is operable through positions of monitor M, ring R and tip T, to first monitor a given wire pair and to identify and check a first and second wire of the wire pair. As previously described, the wiper arms of second sequential switching device 43 move in parallel. Accordingly, every other set of three contacts each on each deck of the second sequential switching device are left blank; the blank contacts being staggered such that the two upper decks of contacts are wired in parallel and the two lower decks of contacts are wired in parallel. This is illustrated in FIG. 2 by conductors 93 and 95 being connected via associated respective wiper arms with the monitor M, ring R and tip T positions on the upper two decks which are in turn connected, respectively, with conductors 67 and 69 leading to monitor means 71 and as indicated hereinbefore with oscillator 73. On the other hand, when the upper two wiper arms are moving through these three contacts, conductors 49 and 51 terminate via associated wiper arms in blank contacts that are not connected elsewhere. On the next sequence of three steps, however, conductors 49 and 51 are connected, respectively, with the monitor M, ring R and tip T positions on the lower two decks, whereas conductors 93 and 95 are connected with blank contacts.

The apparatus at the remote position; for example, the portable identifying means receiver and the portable stepping control means and the field monitor; are connected as described hereinbefore with respect to FIG. 1.

In operation, the respective interconnections are made in the office between the sequential stepping switch, the first group of wire pairs, the second group of wire pairs; such as, those from cables 15 and 87; the second sequential switching device, the oscillator and the extra conductors as described hereinbefore. Ordinarily, since a particular wire pair in a telephone cable is connected with a line finder (not shown) it is desirable to interconnect the old wire pair and the correlated wire pair to prevent rendering the customer's telephone inoperative during the time of making a particular throw from one group to a second group. This can be done by electrical interconnections, illustrated by dashed lines 97 and 99, between the correlated wires in the correlated wire pairs. In this way, whichever wire pair is connected with the subscriber's telephone ultimately connects it with a line finder. Thus, the telephone is operative.

Thereafter the repairman takes his portable gear; including the stepping control means 17, field th 41, amplifier 81, monitor t 71, and probe 77 and headset 86; to the remote position and connects it as described with respect to FIG. 1.

The sequential stepping switch control button is then depressed n times to step sequential stepping switch onto the $n^{th}$ and $j^{th}$ wire pairs of cables 15 and 87.

The second sequential switching device is in the monitor position so the repairman can monitor the $j^{th}$ wire pair to determine if busy. If it is not busy, second sequential switching device button 65 is depressed to actuate second sequential switching device onto the R position. Oscillator 73 having been previously connected to the R position in the top, or first, deck of contacts, the tone emitted by oscillator 73 is connected via conductor 95 and wiper arm 91 onto the ring wire of the $j^{th}$ wire pair. The repairman, using probe 77, amplifier 81, and headset 86, identifies the wire at the remote position carrying the tone signal from oscillator 73. Once this has been identified, electrical continuity is also assured, so second sequential switching device button 65 is depressed to actuate second sequential switching device onto the T position. Since oscillator 73 was connected to the T contact in the second deck of contacts, the tone signal from the oscillator is carried through the wiper arm of the second deck of contacts and conductor 93, and through wiper arm 89 to the tip wire of the $j^{th}$ wire pair. The repairman at the remote position again identifies the wire carrying the tone. Thus, he has completed the identification of the $j^{th}$ wire pair and ensured electrical continuity thereof.

Second sequential switching device button 65 is depressed again to actuate second sequential switching device onto the next sequential contact. As illustrated in FIG. 2 the next sequential contact is blank for the top two decks but it connects conductors 49 and 51 via their respective wiper arms with the monitor position on the third and fourth decks of contacts. Thus, the repairman is able to monitor through monitor means 71 the $n^{th}$ pair of wires in cable 15 to determine if busy. If the telephone circuit is not busy, second sequential switching device button is depressed again to move the wiper arms into the R position. The R position on the third deck of contacts is connected with oscillator 73 but is blank on the first, second and fourth decks. Accordingly, tone from oscillator 73 is connected via wiper arm and conductor 51 through sequential stepping switch wiper arm 33 onto the ring wire of the $n^{th}$ wire pair. The repairman then identifies the wire at the remote position carrying tone from oscillator 73. Identification of this wire ensures that electrical continuity has been checked also.

Second sequential switching device is then actuated, by depressing second sequential switching device button 65, into the T position. The T position is blank on the first, second and third decks but is connected on the fourth deck of contacts with oscillator 73. Accordingly the tone from oscillator 73 is carried via the fourth deck, its wiper arm, conductor 49 and wiper arm 31 of sequential stepping switch to the tip wire of the $n^{th}$ wire pair. The repairman identifies the wire at the remote position carrying the tone from oscillator 73.

Thus, the repairman will have identified the respective wires of the correlated wire pairs at the remote position and is ready to perform the desired operation thereupon.

Typical of such a desired operation is the disconnection of a field telephone formerly connected with the $n^{th}$ pair in cable 15 and connecting it with the $j^{th}$ pair in cable 87. In this way, cable 15 is freed for other purposes; for example, consolidating new phones in a shopping center closer to the office. As indicated hereinbefore, the desired operation may be simply categorizing and placing the respective wires in a tagboard for later use.

Ordinarily, when interconnections 97 and 99 are employed to connect correlated wires in correlated wire pairs, the accuracy of the interconnection is checked by the repairman at the remote position. The respective electrical interconnections are checked by imposition of an identifiable signal onto the ring wire of the $n^{th}$ pair and listening on the ring wire of the $j^{th}$ pair. For example, the repairman may, at the time he imposes the tone from oscillator 73 onto the ring wire of the $n^{th}$ pair, listen via probe 77 to the ring wire of the $j^{th}$ pair. If he hears the tone in both wires, the interconnection has been properly made at the office. Similarly, the remaining, or tip, wires in the correlated wire pairs and their associated electrical interconnection can be checked. This ensures that the customer's telephone will be connected with the line finder and will not be rendered inoperative, except during the specific changeover of the individual wire pair. As indicated hereinbefore, probe 77 will capacitatively detect the tone from oscillator 73 so it is not necessary to sever the respective wires until identification has been completed.

In any event, the repairman is ready to step the sequential stepping switch onto the next identified wire pair or correlated set of wire pairs. Before doing so, however, the repairman will actuate the second sequential switching device into the monitor position. Having moved both the second sequential switching device and sequential stepping switch on the next contact, wire pair ($j$+1) from cable 87 and wire pair ($n$+1) from cable 15 are connected to the terminals of sequential stepping switch and hence to the terminals on the second sequential switching device. As illustrated in FIG. 2, however, the third set of three contacts each in the third and fourth decks of contacts are blanks. On the other hand, the third set of contacts in the top two decks of contacts are connected, respectively, to the M, R and T positions. As indicated before, the top deck has its R position connected with the oscillator and the second deck has its T position connected with the oscillator, although for clarity such interconnections are not specifically shown. The cycle is repeated again as described hereinbefore.

While the invention has been described with respect to leaving blank alternate sets of three contacts each on the second sequential switching device, every set of contacts may be connected and a relay operated to switch the oscillator between the top two decks of contacts and the bottom two decks of contacts.

The use of four decks of contacts on the sequential stepping switch have been specifically described herein since interconnection is facilitated in this way. Other arrangements of the plurality of contacts on the sequential stepping switch can be employed. It is preferable, however, that at least two parallel connected decks of contacts be employed such that the respective contacts are connected with at least two terminals to facilitate interconnection with the second sequential switching device. The embodiment illustrated wherein four terminals, and four decks of contacts are employed is preferred in that the simplified operation described hereinbefore can be effected.

Moreover, similarly as noted hereinbefore with respect to FIG. 1, where it is desired to identify correlated conductors rather than wire pairs, the use of the second sequential switching device is unnecessary since the oscillator may be connected respectively with the decks of contacts or with the at least two terminals on the sequential stepping switch connectable with respective groups of contacts.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. In a method of identifying at a remote position wire pairs in a multiwire cable having the wire pairs identified at one end thereof, the improvement comprising:

a. connecting said wires at said one end in sequence according to their identification to contacts of a sequential stepping switch operable to electrically connect, sequentially and respectively, said contacts with at least one terminal;

b. connecting a second sequential switching device with said terminal, said second sequential switching device being operable for effecting connection, respectively, of a monitor means with a given wire pair via a monitor position for monitoring communication such as conversation on said given wire pair and of a source of an identifiable signal with a first wire and a second wire of said given wire pair for identifying and checking electrical continuity of the first wire and second wire in said given wire pair;

c. establishing communication from said remote position with said stepping switch and said second sequential switching device;

d. actuating said stepping switch from said remote position to sequentially step said stepping switch to a specifically identified wire pair; monitoring with said monitor means said wire pair through said second sequential switching device; actuating said second sequential switching device onto said first wire of said wire pair and imposing an identifiable signal from said source on said first wire and identifying said first wire at said remote position; and actuating said second sequential switching device onto said second wire of said wire pair; and imposing an identifiable signal on and identifying said second wire at said remote position;

e. performing a desired operation on said specifically identified wire pair; and f. repeating steps (d) and (e) as desired with respect to other, respective, specifically identified wire pairs.

2. The method of claim 1 wherein said second sequential switching device is moved to its monitor position at least by the time said stepping switch is stepped to the next identified wire pair.

3. The method of claim 1 wherein said communication of step (c) is established by way of extra conductor means in said cable.

4. The method of claim 1 wherein said communication of step (c) is established by way of a carrier signal imposed upon said cable and information and command signals are modulated into and demodulated from said carrier signal.

5. The method of claim 1 wherein said identifiable signal is imposed onto, respectively, said first wire and said second wire through said second sequential switching device at said one end and the wire carrying said identifiable signal is identified at said remote position.

6. The method of claim 1 wherein there is included, for identifying correlated wire pairs in a first group and in a second group, the additional steps of:

a. connecting said correlated wire pairs in sequence according to their identification to second contacts associated with said sequential stepping switch, said stepping switch operable to electrically connect, sequentially and respectively, said second contacts with at least one other terminal;
b. connecting said second sequential switching device with said other terminal;
c. simultaneously and sequentially stepping said stepping switch to specifically identified wire pairs; monitoring with said monitor means, respectively, said wire pairs through said second sequential switching device; actuating said second sequential switching device, respectively, onto said first wire of each of said specifically identified wire pairs and imposing an identifiable signal on, and identifying at said remote position said respective first wire; and actuating said second sequential switching device, respectively, onto said second wire of each of said specifically identified wire pairs and imposing an identifiable signal on and identifying said respective second wire at said remote position;
d. performing a desired operation upon said specifically identified wire pairs; and
e. repeating steps (c) and (d) as desired with respect to other, respective, specifically identified wire pairs.

7. The method of claim 6 wherein respective electrical interconnections are provided between correlated wires of said wire pairs in said first group and said second group and the respective electrical interconnections are also checked to prevent error before performing the desired operation upon said wires in accordance with step (d).

8. The method of claim 6 wherein said desired operation of step (d) comprises disconnecting one of said specifically identified wire pairs from a field pair and connecting said field pair to the other of said specifically identified wire pairs.

9. In a system for identifying at a remote position wires in a multiwire cable having the wires identified at one end, the improvement comprising:

a. a sequential stepping switch having a plurality of contacts electrically connected with respective wires at said one end and operable to electrically connect respective contacts with a terminal in said switch;
b. a second sequential switching device electrically connected with said terminal of said sequential stepping switch and operable into a first position for monitoring via a monitor means at said remote position both wires of a given wire pair for communication, into a second position for connecting an identifying transmitting means with the first wire of said given wire pair, and into a third position for connecting an identifying transmitting means with the second wire of said given wire pair;
c. identifying transmitting means electrically connected with said second and third positions of said second sequential switching device for imposing an identifiable signal onto, respectively, said first wire and said second wire in said given wire pair;
d. portable identifying receiving means for detecting said identifiable signal and isolating the wire carrying said identifiable signal at said remote position;
e. monitor means located at said remote position and connected by a communications link with said first position of said second sequential switching device for monitoring said given wire pair for communication before imposing said identifiable signal onto the respective wires of said given wire pair; and
f. portable stepping control means located at said remote position and connected by a communications link with said sequential stepping switch and with said second sequential switching device for actuating said sequential stepping switch to its respective contacts and for actuating said second sequential switching device to its first, second and third positions.

10. The system of claim 9 wherein said sequential stepping switch includes parallel decks of contacts, each deck having respective wires of said wire pairs, and associated, respectively, therewith parallel wiper arm means, and an actuating mechanism for moving said wiper arm means sequentially into electrical connection with said contacts on each of said parallel decks.

11. The system of claim 9 wherein a field monitor is also connected with said portable stepping control means for maintaining a record at said remote position of the specifically identified wire pair onto which said sequential stepping switch has been actuated.

12. The system of claim 9 wherein said sequential stepping switch is separately resettable from said remote position to a starting position.

13. The system of claim 9 wherein said second sequential switching device is connected in parallel with said sequential stepping switch to said portable stepping control means and advances to the next sequential contact when said sequential stepping switch advances to the next sequential contact.

14. A system for connecting at a remote position wire pairs of a first group with correlated wire pairs of a second group comprising:

a. a first group of wire pairs having its wire pairs identified at one end;
b. a second group of wire pairs having its wire pairs identified at said one end;
c. a sequential stepping switch having a first group of contacts connected sequentially with wire pairs of said first group of wire pairs, having a second group of contacts connected sequentially with wire pairs of said second group of wire pairs and operable to electrically connect respective contacts of the correlated wire pairs to at least two respective terminals;
d. a second sequential switching device selectively connectable with said respective terminals and operable into a first position for monitoring via a monitor means at said remote position both wires of a specifically identified wire pair for communication, into a second position for connecting an identifying transmitting means with the first wire of said specifically identified wire pair, and into a third position for connecting an identifying transmitting means with the second wire of said specifically identified wire pair;
e. identifying transmitting means connected respectively with said second position and said third position of said second sequential switching device for imposing an identifiable signal onto, respectively, said first wire and said second wire of said specifically identified wire pair;
f. portable identifying receiving means for detecting said identifiable signal and isolating the wire carrying said identifiable signal at said remote position;
g. monitor means located at said remote position and connected by a communications link with said first position of said second sequential switching device for monitoring said specifically identified wire pair for communication before imposing said identifiable signal onto the respective wires of said specifically identified wire pair; and h. portable stepping control means located at said remote position and connected by a communications link with said sequential stepping switch and with said second sequential switching device for actuating said sequential stepping switch to its respective contacts connected with correlated wire pairs and for remotely actuating said second sequential switching device to its first, second and third positions for each of said correlated wire pairs.

15. The system of claim 14 wherein a field monitor is connected with said portable stepping control means for maintaining a record at said remote position of the specifically identified wire pair onto which said sequential stepping switch has been actuated.

16. The system of claim 14 wherein said correlated wire pairs have their respective wires connected onto four decks of contacts, said decks having means connecting their respective contacts with respective terminals, the resulting four terminals facilitating interconnection with said second sequential switching device.

17. In a system for identifying at a remote position conductors comprising wire pairs in a multiconductor means having the conductors identified at one end thereof, the improvement comprising:

a. a sequential stepping switch having parallel decks of contacts, each having a plurality of contacts electrically connected in sequence with respective wires of said wire pair at said one end of said multiconductor means, and respective terminals, said sequential stepping switch being operable to electrically connect, sequentially and respectively throughout said sequence said contacts of correlated wire pairs with said terminals;

b. a second sequential switching device that is connected with said terminals and operable into a first position for connecting an identifying transmitting means with the first wire of said given wire pair, and into a second position for connecting an identifying transmitting means with the second wire of said given wire pair;

c. identifying transmitting means connected with second contacts at said first and second positions of said second sequential switching device for imposing an identifiable signal onto specifically identified wires connected with said terminals;

d. portable identifying receiver means that is connectable with respective said wires so as to detect said identifiable signal for detecting said identifiable signal and isolating the wire carrying said identifiable signal at said remote position;

e. portable stepping control means for actuating said sequential stepping switch from said remote position; said portable stepping control means being operable to advance said sequential stepping switch individually and sequentially throughout said sequence of contacts; and f. communications link connecting said sequential stepping switch and said portable stepping control means.

* * * * *